United States Patent

Gerstung et al.

[11] Patent Number: 5,436,837
[45] Date of Patent: Jul. 25, 1995

[54] SYSTEM FOR CONTROLLING A MOTOR VEHICLE

[75] Inventors: Ulrich Gerstung, Vaihingen/Enz; Dieter Hall, Schwieberdingen; Michael Kirschner, Ludwigsburg; Werner Zimmerman, Stuttgart; Joachim Berger, Winterbach; Martin Grosser, Stuttgart; Dieter Seher, Ilsfeld; Wolf Wessel, Oberriexingen, all of Germany; Wolfgang Bittinger, Wien, Austria; Wolfgang Dittrich, Wien, Austria; Felix Forster, Wien, Austria; Stefan Poledna, Wien, Austria; Karl-Heinz Schmidt, Oberwart, Austria

[73] Assignee: Robert Bosch GmbH, Germany

[21] Appl. No.: 843,011

[22] Filed: Feb. 28, 1992

[30] Foreign Application Priority Data

May 8, 1991 [DE] Germany .............. 41 14 999.8

[51] Int. Cl.⁶ .................................... G06F 11/30
[52] U.S. Cl. ............... 364/424.03; 340/438; 371/25.1; 371/68.1
[58] Field of Search ........ 364/424.03, 424.04, 364/431.01, 431.11, 550, 551.01; 73/117.2, 117.3; 340/438, 439; 371/25.1, 26, 68.1

[56] References Cited

U.S. PATENT DOCUMENTS

| 4,532,594 | 7/1985 | Hosaka et al. | 364/431.11 |
| 4,583,176 | 4/1986 | Yamato et al. | 364/431.11 |
| 4,615,321 | 10/1986 | Haefner et al. | 340/438 |
| 4,797,828 | 1/1989 | Suzuki et al. | 364/431.11 |
| 4,881,227 | 11/1989 | Bühren | 364/431.11 |
| 4,928,242 | 5/1990 | Suzuki | 364/424.03 |
| 5,142,474 | 8/1992 | Miyata et al. | 364/431.11 |
| 5,153,835 | 10/1992 | Hashimoto et al. | 364/431.11 |
| 5,235,527 | 8/1993 | Ogawa et al. | 364/431.11 |
| 5,274,554 | 12/1993 | Takats et al. | 364/424.03 |

FOREIGN PATENT DOCUMENTS

| 0127789A3 | 12/1984 | European Pat. Off. |
| 0222047A1 | 5/1987 | European Pat. Off. |
| 0322141A2 | 6/1989 | European Pat. Off. |
| 3240707 | 5/1984 | Germany |
| 3531198 | 3/1987 | Germany |
| 2026705 | 2/1980 | United Kingdom |
| 2172715 | 9/1986 | United Kingdom |

OTHER PUBLICATIONS

Steffen Storandt et al.; "Sichere und Fehlertolerante Mikrocontroller-Systeme," Electronik, vol. 38, No. 10, May 12, 1989, Munchen, Germany, pp. 88–90; p. 89, column 1, line 15–line 25.

Primary Examiner—Gary Chin
Attorney, Agent, or Firm—Kenyon & Kenyon

[57] ABSTRACT

A system for controlling a motor vehicle includes a first device for determining control data required for controlling the motor vehicle. A second device monitors the first device. The first device determines second data on the basis of first data, pursuant to a test function. The second device determines third data on the basis of the first data, pursuant to the same test function. The first and/or the second device recognizes an error state relevant to safety, dependent upon a comparison between the second data and the third data.

17 Claims, 10 Drawing Sheets

SYSTEM FOR CONTROLLING A MOTOR VEHICLE

FIELD OF THE INVENTION

The present invention relates to a system for controlling a motor vehicle and in particular to such a system which includes a control device and a monitoring device coupled to the control device for monitoring the control device.

BACKGROUND INFORMATION

A system for controlling a motor vehicle is known from German No. DE-OS-35 31 198. The system, which is for controlling a diesel engine, comprises a main processor and a substitute processor. If a monitoring device recognizes a defect in the main processor, the system switches over to the substitute processor.

Furthermore, systems are known in which a first microprocessor determines control data which are required for control of the motor vehicle. A monitoring device checks whether the first microprocessor is functioning correctly. This monitoring device can be structured as a microprocessor or, in the simplest form, as a hard-wired module. If the monitoring device recognizes an operating state which is critical to safety, the output value relevant to safety goes into a safe state via a corresponding safety signal. This means, for example, that the fuel injection is stopped and/or the throttle valve is closed.

Such a monitoring device is known, for example, from German No. DE-OS-32 40 707. The monitoring device described therein applies a so-called trigger signal to the control device at regular intervals. If the distance between two trigger impulses is greater or less than a time period stored in the monitoring device, the monitoring device detects an error and initiates corresponding measures. With such a monitoring concept, it is essentially only total failure of the processor that can be recognized. Such a watchdog circuit does not recognize defective signal processing.

SUMMARY OF THE INVENTION

The present invention provides a system for monitoring a control device of a motor vehicle. The system includes the control device, preferably a microprocessor, and a monitoring device coupled to the control device. The control device receives first data and determines second data based thereon in accordance with a predetermined test function. The monitoring device also receives the first data and determines third data based thereon in accordance with the same test function. The second data and third data are then compared in order to detect a malfunction in the system based on whether the data matches.

The system according to the present invention is structured more simply than known systems with two processors, and, at the same time, detects more errors than systems with a watchdog circuit, and thus guarantees a high degree of safety.

DETAILED DESCRIPTION

The system according to the present invention is based on the concept that a microprocessor and a monitoring device both carry out signal processing at regular time intervals, where the monitoring device and/or the microprocessor compare the two results and draw a conclusion concerning correct or defective functioning of the microprocessor on the basis of this comparison.

The calculation carried out preferably has a very simple structure. The situation is not that of parallel processor systems, there may not be two microprocessors, nor does the monitoring device carry out the same calculation as the microprocessor. Instead, the method of operation is such that both the microprocessor and the monitoring device each calculate result data, and proceed from the same data, pursuant to a predetermined test function.

These result data are then compared and an error is recognized on the basis of this comparison. The test function used to calculate the result data has a very simple structure, as a rule, and requires only a small amount of calculation time.

Figure 1:
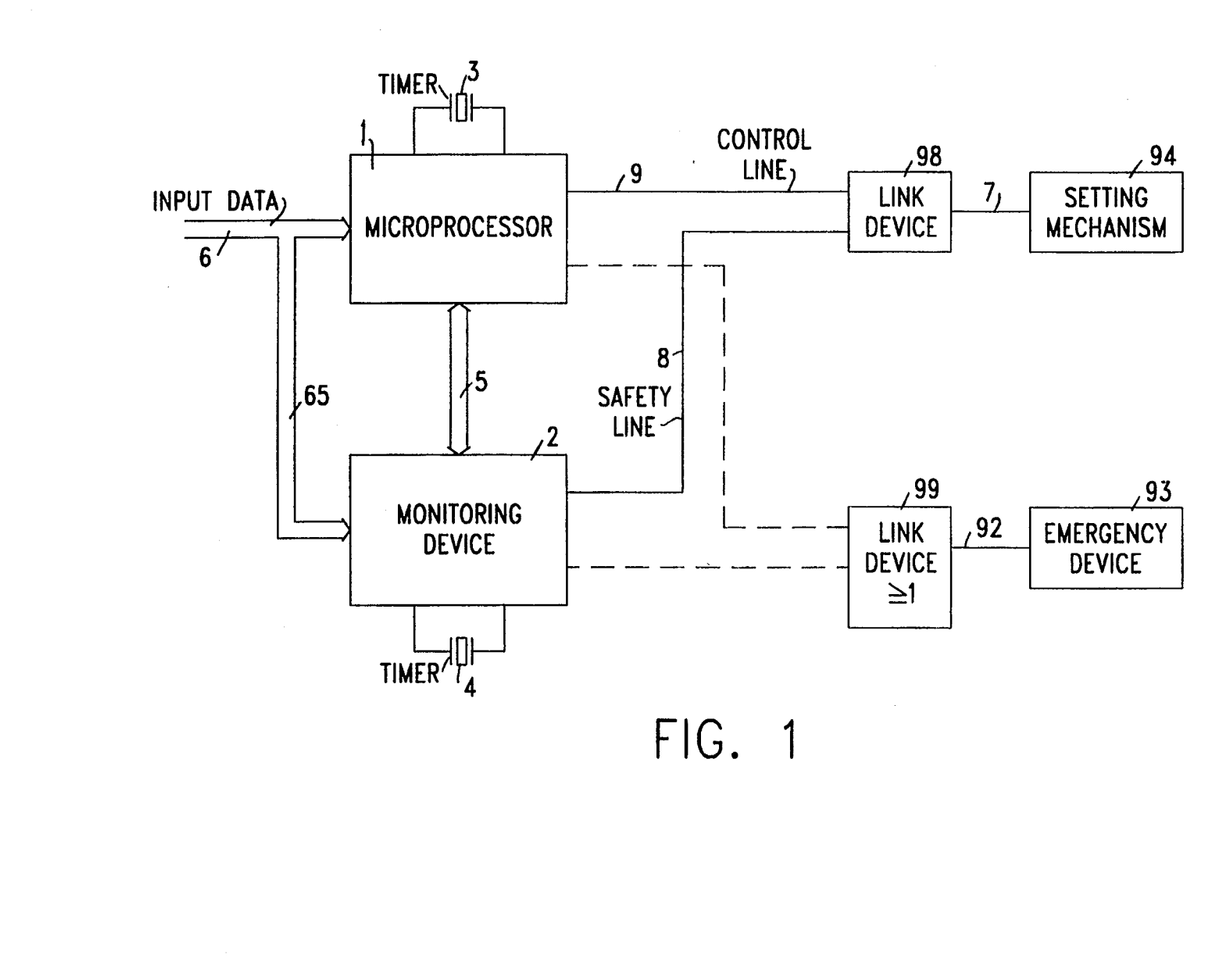
FIG. 1 shows a block diagram of a system according to the present invention.

FIG. 1 shows a block diagram of a system according to the present invention. A microprocessor which is also designated as the first device is represented as 1. A second device, also designated as the monitoring device, is referred to as 2. The microprocessor 1 and the monitoring device 2 are connected to each other via a data line 5. Furthermore, the microprocessor is connected to an input data line 6. From this input data line 6, a second input data line 65 branches off and leads to the monitoring device 2.

Both the microprocessor 1 and the monitoring device 2 are each connected to an independent timer 3 and 4, respectively. The microprocessor outputs a signal to a link device 98, via the control line 9. The second input of the link device 98 has a safety signal applied to it via a safety line 8. Via the output line 7, a setting mechanism 94 then has an output value applied to it.

In a preferred embodiment of the present invention, both the microprocessor 1 and the monitoring device 2 are connected to another link device 99. This second link device outputs a signal for control of an emergency device 93, via an emergency line 92. Preferably, this emergency device interrupts the fuel feed.

The setting mechanism for influencing the power output of the engine usually has signals applied to it by the microprocessor 1, which result in a corresponding adjustment of the setting mechanism. The monitoring device monitors the microprocessor for correct function.

Via the data line 5, the microprocessor 1 and the monitoring device 2 exchange data. Preferably, these are data coded as pulses, in serial or parallel form. The transmission can take place in only one direction, preferably from the microprocessor to the monitoring device, or in both directions.

The microprocessor calculates output values for control of the setting mechanism of the engine based on the data passed in via the input data line 6, with regard to various operating conditions. In the case of output values with particular relevance to safety, the correct functioning of the microprocessor 1 must be checked by the monitoring device 2. Such output values relevant to safety, i.e., with respect to the setting mechanism, are, for example, the fuel injection, especially in the case of diesel engines, the throttle valve setting in engines with spark ignition, intervention in steering and braking, as well as all values which influence the driving behavior of the engine.

If the monitoring device recognizes an operating state that is critical for safety, it generates a safety signal which is passed to the link device 98 via the safety line 8. The link device 98 then initiates emergency driving measures. If a status critical for safety is present, the output value of the link device for controlling the setting mechanism lies in such a value range that no dangerous operating parameters occur. For example, when controlling the fuel feed, it can be provided that the amount of fuel to be injected is limited to a maximum permissible value.

Figure 2:
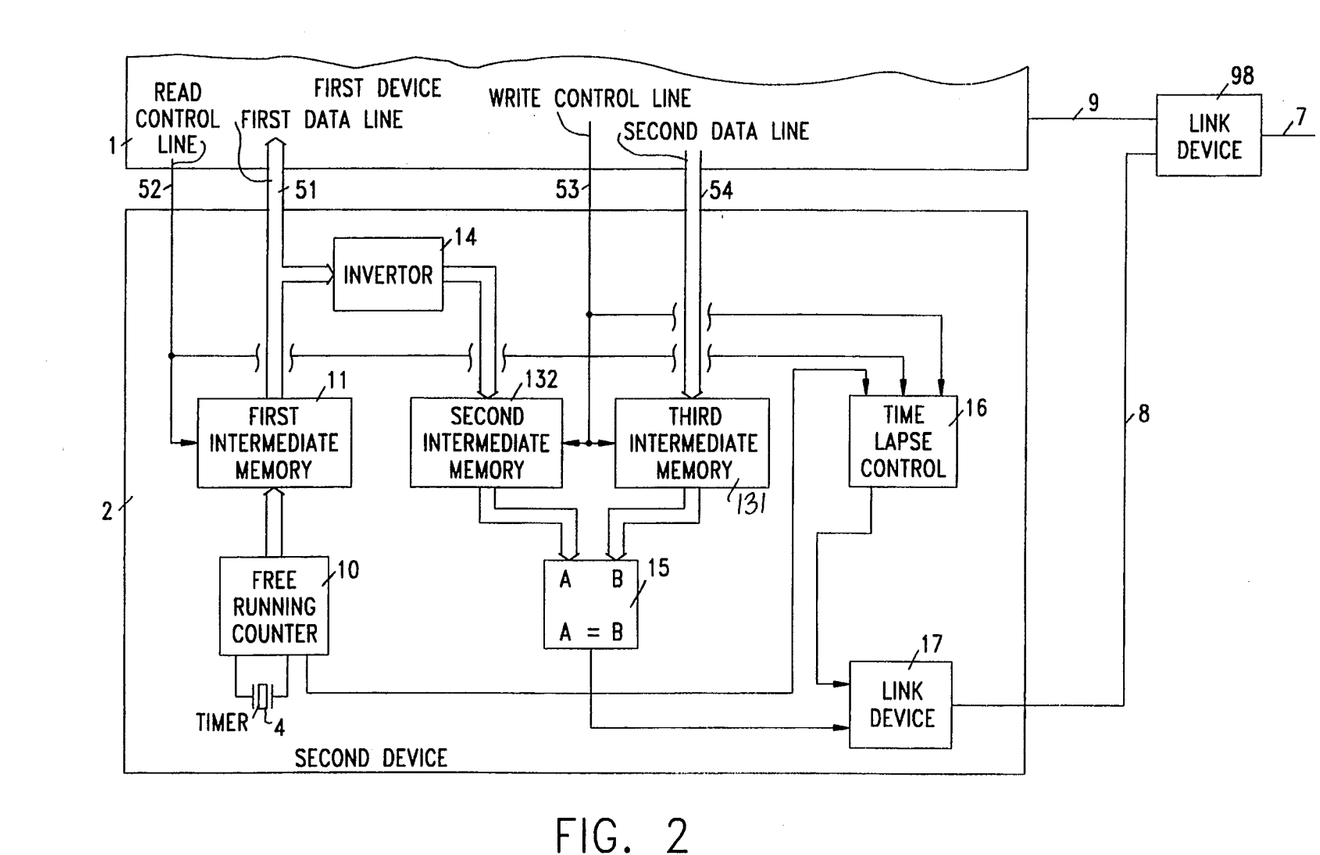
FIG. 2 shows a more detailed representation of the monitoring device shown in FIG. 1.

FIG. 2 shows an implementation of the monitoring device 2 in more detail. Elements which are already contained in FIG. 1 are designated with corresponding reference symbols. The microprocessor 1 is connected with a first intermediate memory 11 and a time lapse control 16 of the monitoring device 2 via a read control line 52.

Via a first data line 51, the data of the intermediate memory 11 is fed to the microprocessor 1. The data of the first intermediate memory is read out of a free-running counter 10, which is connected to the timer 4. The counter 10 is further connected to the time lapse control 16. The first intermediate memory 11 is further connected to a second intermediate memory 132 via an invertor 14. Via a write control line 53, the microprocessor is connected to the second intermediate memory 132, a third intermediate memory 131, as well as with the time lapse control 16. Via a second data line 54, the microprocessor applies data to the third intermediate memory 131.

A comparator 15 is connected to the second intermediate memory 132 and the third intermediate memory 131. The outputs of the comparator 15 and the time lapse control 16 are applied to a further link device 17, which, in turn, applies the safety signal to the link device 98 to form the output value for controlling the setting mechanism.

The method of operation of the system is as follows. The microprocessor 1 sends a read command to the first intermediate memory 11, via the read control line 52. Thereupon, the content of the first intermediate memory 11 is read into the microprocessor via the data line 51. The content of the first intermediate memory 11 corresponds to the content of the free-running counter 10. This counter 10 counts the pulses given off by the timer 4. The microprocessor inverts the data read out of the first intermediate memory 11, i.e., the microprocessor calculates the inverse value. For digital signals, this means that all logic values are inverted.

Via the write control line 53, the third intermediate memory 131 is activated and the microprocessor writes the counter status inverted by the microprocessor into the third intermediate memory 131. The counter status read by the microprocessor is stored in the first intermediate memory 11 during the read process. During the write process the content of the first intermediate memory 11 is converted to its inverse form by invertor 14 and stored in the second intermediate memory 132.

The second intermediate memory 132 therefore contains the value inverted in the monitoring device 2, and the third intermediate memory 103 contains the value inverted by the microprocessor. These two values are compared in the comparator 15. If the two values do not correspond, emergency driving measures are initiated, i.e., the safety signal takes on such a value that the output signal relevant to safety is set into the safe operating state. Preferably, the engine is shut off.

The time lapse control 16 intervenes in the safety signal via the further link device 17. The time lapse control 16 monitors whether the read control signal is periodically applied and ensures that a certain maximum time between the application of the read control signal and the subsequent write control signal is not exceeded. If this is the case, a corresponding signal is also issued.

The functions of the monitoring device and the microprocessor can also be interchanged, in particularly advantageous manner, in this embodiment of the present invention. This means, for example, that the counter may be located in the microprocessor, and the monitoring device may read the counter status from the microprocessor. The comparator 15 can also be contained in the microprocessor. All that is necessary is that both the microprocessor and the monitoring device process invert the same data and that the microprocessor and/or the monitoring device compares the two results. If the two results differ from each other and/or if the result is not available within a certain period of time, a defective operating state is recognized.

It is also possible, with another embodiment of the present invention, to check the monitoring device for incorrect functioning. The method is as follows. The microprocessor occasionally gives off an incorrect result, i.e., it exceeds the predetermined time limit. This has the consequence that the monitoring device recognizes an error. The error message of the monitoring device is transmitted to the microprocessor via the data line 5. The microprocessor checks whether the error message occurs. So that no unintentional influence on the output values occurs in the system as a whole, the safety signal only becomes active after an additional delay time, if the microprocessor does not correct the result within the delay time.

Figure 3:
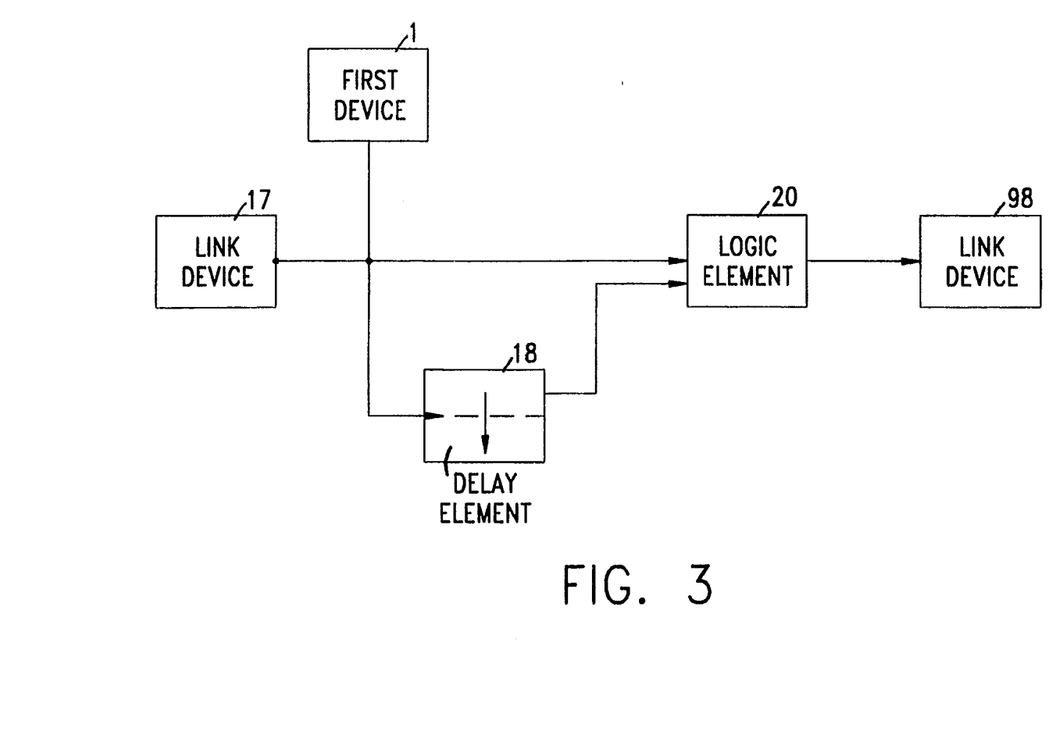
FIG. 3 shows an addition to the system shown in FIG. 2.

For this, it is necessary that the device shown in FIG. 2 is supplemented with the device shown in FIG. 3. The output signal of the link device 17 is passed to a delay element 18, a logic element 20 and the microprocessor 1. The logic element 20 links the output signal of the delay element 18 and the output signal of the link device 17. Because the safety signal is passed back to the microprocessor, the latter has the possibility of checking whether the monitoring device is functioning correctly. If the microprocessor intentionally gives off a defective signal via the data connection 54, then the safety signal must attain an error state. The delay element 18 ensures that an error signal is present at the second input of the logic element 20 only after a certain delay time. At the output of the logic element, a safety signal is present only if the output signal of the link device 17 indicates an error over a longer period of time. This has the effect that short-term response of the monitoring device does not result in an error message and therefore in a reduction of the output of the engine. Only when the signal is present for a longer period of time and it can be definitely assumed that the microprocessor did not intentionally give off a defective signal is a corresponding safety signal given off.

Figure 4:
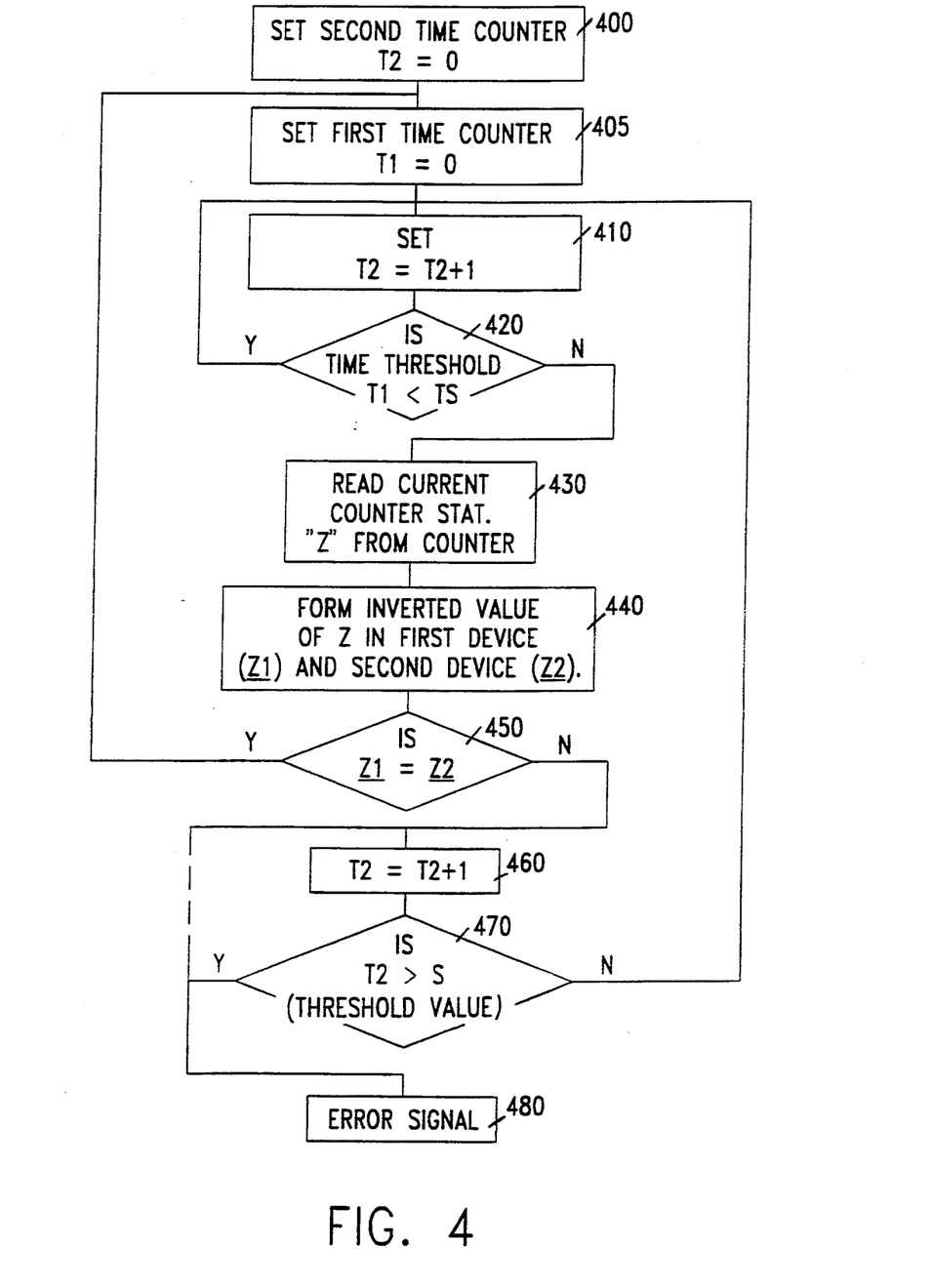
FIGS. 4, 5a and 5b show flow charts illustrating a method of operation according to the present invention.

FIG. 4 illustrates the method of operation according to the present invention in a flow chart. In Step 400, a second time counter T2 is set to zero, and in Step 405, a first time counter T1 is set to zero. In Step 410, an increase of the first time counter T1 takes place. If in step 420 it is recognized that a predetermined time threshold TS has not yet been exceeded, Step 410 is repeated. This happens until the time counter exceeds the threshold value. If a predetermined time threshold has been exceeded, the microprocessor reads the current counter status Z out of the counter 10 of the monitoring device.

In Step 440, the microprocessor and the monitoring device 2 form the inverted values Z1 and Z2. With a digital signal, a simple implementation provides that zeros are replaced by ones and ones by zeros. This inversion takes place simultaneously in the microprocessor and the monitoring device. In Step 450, the comparator 15 checks whether the two inverted values agree.

Instead of a comparison, a value can merely be inverted in the microprocessor. If the inverted value and the original value are subsequently added, an addition result must be obtained which contains only ones. If in Step 450 it is recognized that the values are the same, a new program cycle starts with Step 405, in which the first time counter Z1 is reset again. If, on the other hand, the inquiry 450 recognizes that the values are unequal, this means that the microprocessor is operating incorrectly. In the simplest case, an error signal is therefore given off in Step 480. This is shown with broken lines.

An advantageous further development provides that in Step 460, the second time counter is increased. Only when in Step 470 it is recognized that the second time counter T2 is greater than a threshold value S is an error output. If this threshold value has not yet been reached, the program continues with Step 410, in which the first time counter is increased. This method of operation guarantees that errors are only recognized if in Step 450 an implausibility of the signals is recognized more than once. In this way, errors which occur only once can be prevented.

Another structure may provide for the following method of operation. The monitoring device 2 applies data in the form of a test value to the microprocessor 1 at a predetermined point in time. The microprocessor processes this test value in accordance with at least one predetermined test function. Parallel to this, the monitoring device processes the test value with a corresponding test function. The monitoring device sets a time range between TMIN and TMAX, within which the microprocessor must transmit a result to the monitoring device. If the result does not arrive within these predetermined time limits, or if it arrives incorrectly, the monitoring device recognizes an error.

When the monitoring device receives the result from the microprocessor, it gives the new test value to the microprocessor. It is particularly advantageous if the test values are determined by a random selection. For this purpose, an independent counter continuously counts from zero to an end value, or from an end value down to zero. At predetermined times, the counter status of the free-running counter is read and used as a test value. Such preferred time points are given when the monitoring device receives data transmitted by the microprocessor, or when the monitoring device has recognized the correction function of the microprocessor.

It is particularly advantageous to select a 4-bit counter with a frequency of one MHz for the counter. Thus, 16 different test values can be predetermined. If the monitoring device receives the result value transmitted to it, the counter status is read, and passed to the microprocessor as a new test value. The new test value depends on the occurrence of the old result value. The defined point in time preferably lies between when the result value was read and when the correct function of the microprocessor was recognized.

Figure 5A:
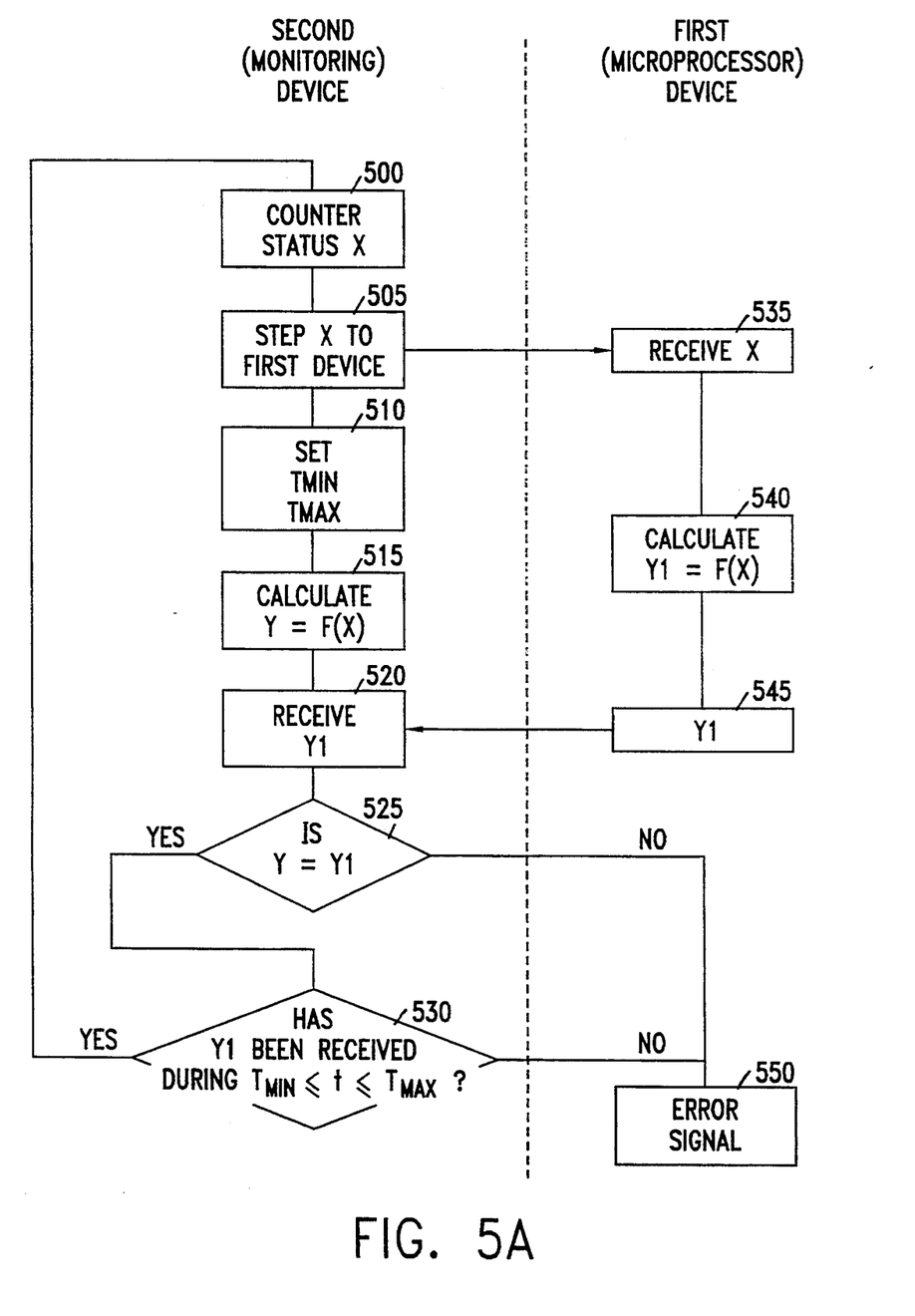

To clarify this method of operation, reference is also made to the flow chart in FIG. 5a. The left half of the figure shows the sequence of the program in the monitoring device, and the right half shows the program in the microprocessor. In Step 500, the program starts in the monitoring device in that the counter status of a counter is read. This counter status is used as test value X.

In Step 505, the test value is passed to the microprocessor. Subsequently, the monitoring device provides a lower time limit TMIN and an upper time limit TMAX in Step 510. In Step 515, a result value Y is calculated from a test value X pursuant to the test function F. In Step 535, the microprocessor receives the result value Y transmitted to it. In the course of the usual program sequence for calculating the control data, individual calculation steps are inserted, in which the result value Y1 is calculated on the basis of the test value X. These calculations are shown in Step 540.

It is particularly advantageous if each functional block of the microprocessor has a test function assigned to it. In Step 545, the result Y1 is passed to the monitoring device, which acquires the value in Step 520. In Step 525 it is checked whether the result Y set by the monitoring device agrees with the result Y1 determined by the microprocessor. If this is not the case, in Step 550 an error is recognized. If the result is correct, in Step 530 it is checked whether the result has been received during the predefined time interval between TMIN and TMAX. If this is also the case, a new counter status is read as the test value in Step 500.

Here again, it can be provided that the microprocessor sends incorrect results to the monitoring device at predetermined intervals, in order to monitor its functioning capacity.

The test function is processed during the usual control program. However, the test function is not needed for calculation of the test data. The calculation of the test function is divided among the individual components of the microprocessor and its peripheral modules in such a way that even external components such as the memory and the data and address bus can be checked.

Figure 5B:
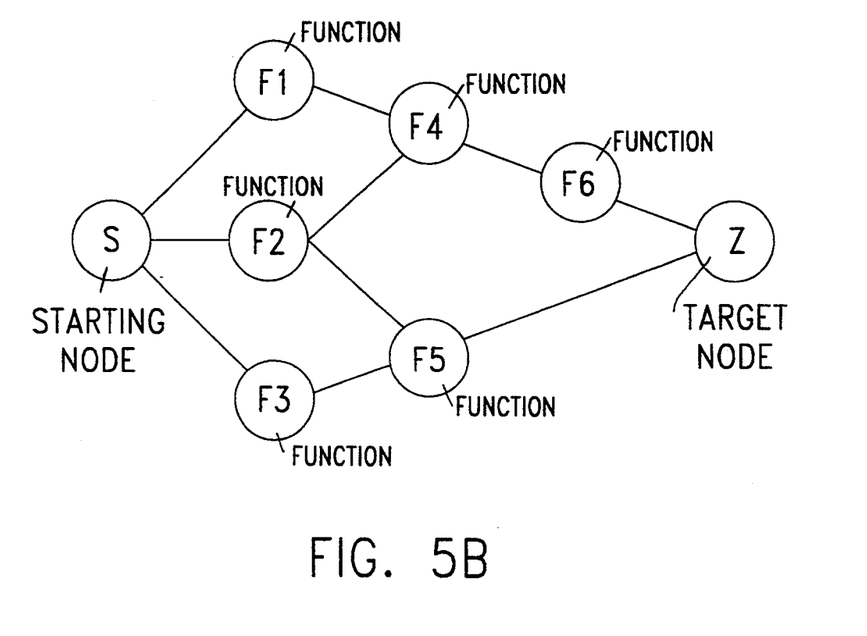

In order to be able to carry out particularly informative monitoring, the following method is applied. If the amount of the safety-relevant function which is to be monitored by the monitoring device is considered, the function sequence in terms of time can be represented as a directed, cycle-free graph. An example of such a graph is shown in FIG. 5b. At the starting node S of the graph, the test value is fed into the monitoring device, at the target node Z, the result is to be delivered to the monitoring device.

Each node has a number of edges which lead to it, each of these edges yielding an input value. The node calculates the output value on the basis of the input values, pursuant to a function F1, F2, ... F6, which is passed on to all nodes which can be reached directly. The target node also receives a number of inputs. If the function sequence is without errors, the target node delivers the result to the monitoring device. Parallel paths in the graph represent the parallel sequence of the program, and sequential paths represent the serial sequence of the program.

The calculation of the control values in the microprocessor also takes place pursuant to such a graph. The graph used for calculation of the control values has the same structure, i.e., it possesses the same nodes and edges with the same arrangement. The calculation of the result takes place pursuant to different functions. A test function is assigned to each function for calculating the control value; this function is processed during, before or after the control function. If the individual test functions F1, F2, ... F6 are suitably selected, a failure of a partial function of the microprocessor can also be reliably recognized. In the monitoring device, calculation of the result also takes place with this graph and the test function. If the microprocessor is working correctly, these two results agree.

Figure 6A:
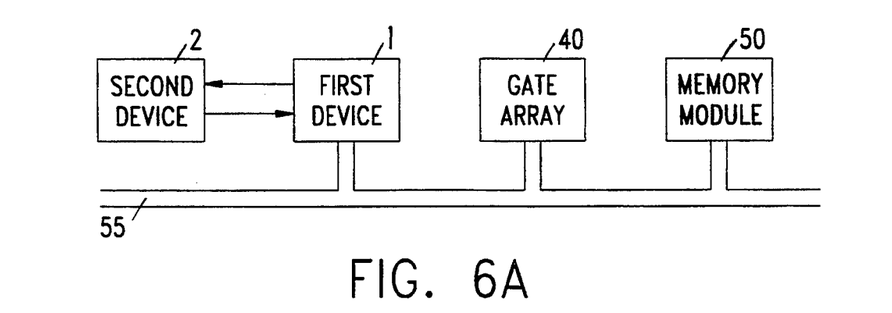
FIGS. 6a, 6b and 6c show various arrangements for coupling the monitoring device to the microprocessor.

The microprocessor 1 and the monitoring device 2 can be connected to each other in different ways. Three different possibilities of coupling the monitoring device and the microprocessor are shown in FIGS. 6a, 6b and 6c.

The various components, such as a memory module 50, a gate array 40 and the microprocessor 1 are connected to each other via a data/address bus. The gate array is an integrated electronic circuit with which various logic circuits can be implemented. The gate array is preferably used for address coding and for redundant signal acquisition. In the arrangement shown in FIG. 6a, the monitoring device 2 is coupled directly to the microprocessor via a serial interface 45. This arrangement offers the advantage that the data/address bus is not used in checking.

Figure 6B:
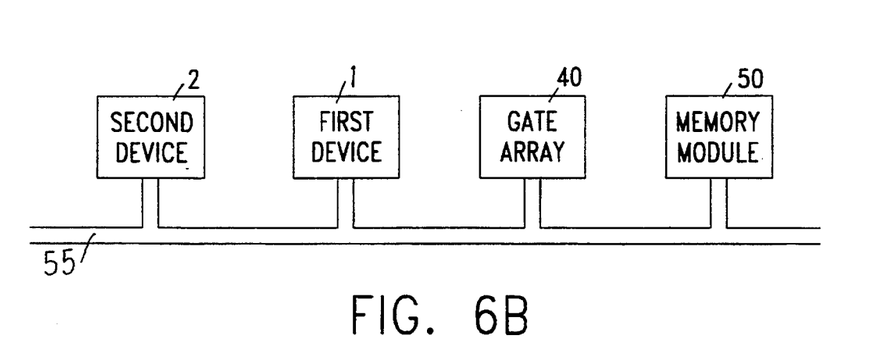

In the arrangement shown in FIG. 6b, the monitoring device is also connected to the data/address bus and exchanges data with the microprocessor via this bus. This results in the advantage that no serial interface, which is slow and requires a high expenditure in terms of hardware, is required. Also no additional serial interface is needed at the microprocessor.

Figure 6C:
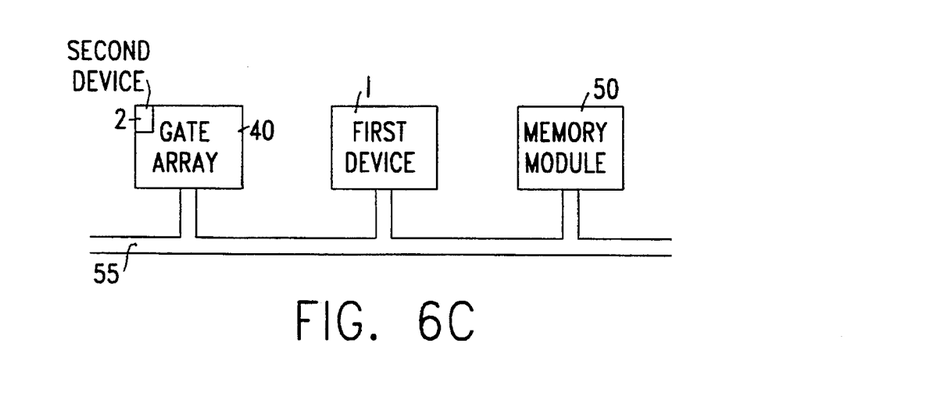

In the arrangement shown in FIG. 6c, the gate array and the monitoring device form a structural unit. This results in the additional advantage, as compared with the arrangement shown in FIG. 6b, that the failure rate is reduced, since the number of components is lower.

Figure 7A:
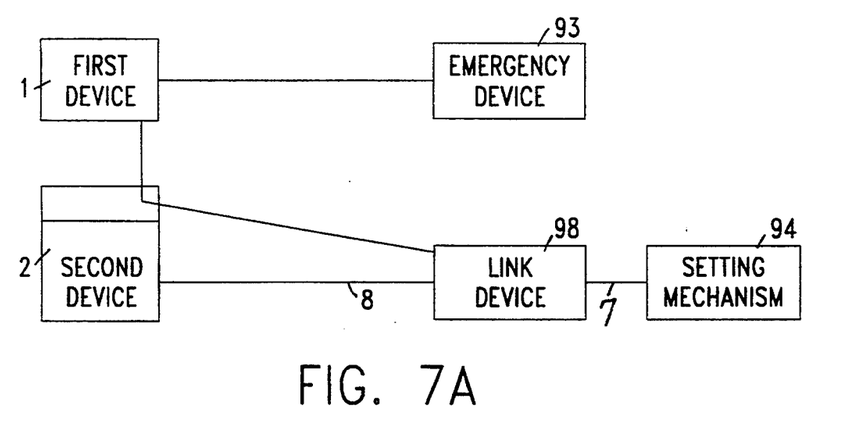
FIGS. 7a, 7b and 7c show various schematic representations of the elements.
Figure 7B:
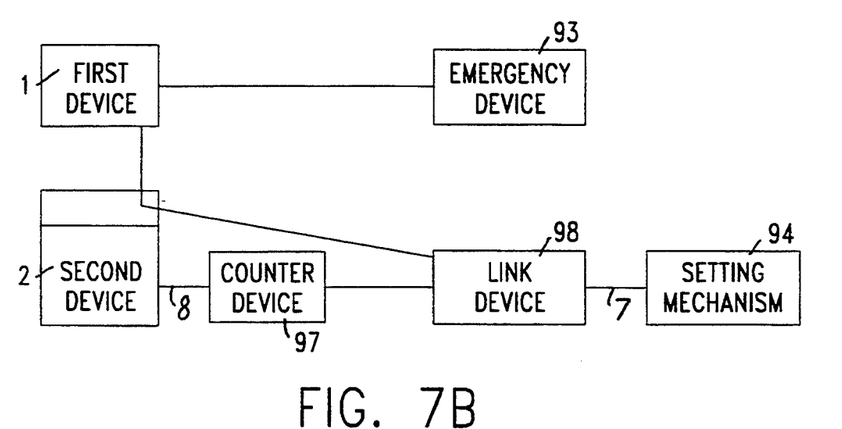
Figure 7C:
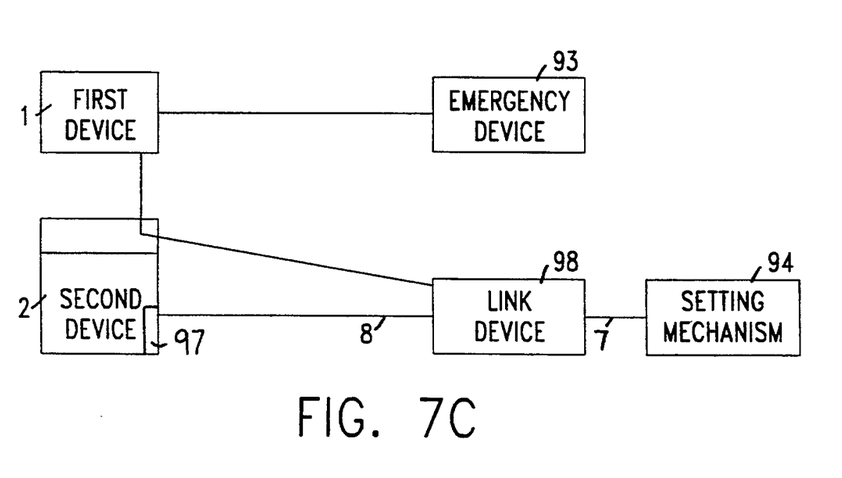

In FIGS. 7a, 7b and 7c, the elements of a system according to the present invention are shown in various schematic representations. As shown in FIG. 7a, the microprocessor may be connected to the monitoring device 2 and to the emergency device 93 via one line each. The monitoring device 2 is connected to a link device 98 via two lines, which applies the output value to the setting mechanism 94 via the output line 7.

In this embodiment, the microprocessor and the monitoring device determine what program step is just being processed by the microprocessor, as a function of time. The microprocessor sends the output value to the monitoring device, which passes it directly to the link device 98. If the monitoring device 2 recognizes that the microprocessor is not working correctly, it sends a corresponding signal indicating the existence of an error condition to the link device 98. If this signal is present, emergency driving measures are initiated. The microprocessor can cause the engine to be shut off via the emergency device, independent of the other components. The emergency device preferably prevents fuel feed.

The system shown in FIG. 7b differs from that shown in FIG. 7a in that in FIG. 7b a counter device 97 is included in the output line 8 of the monitoring device 2, which transmits possible error conditions to the link device. This counter 97 counts how often an error state occurs. The counter device passes on the signal concerning the error state only after a predetermined counter status has been reached.

Emergency driving measures are initiated only if the monitoring device has recognized an error state of the first device several times.

The system shown in FIG. 7c differs from the system shown in FIG. 7b in that the counter 97 is integrated into the monitoring device and forms a structural unit with it.

Another embodiment of the system according to the present invention provides that the microprocessor transmits certain data, for example the current position of the program counter, to the monitoring device at predefined time intervals. The monitoring device checks whether the data agrees with the predetermined reference data, and whether they are present at the predetermined point in time.

The reference data and the time points can either be fixed in the monitoring device, or can be assigned by the microprocessor during so-called basic initialization. Furthermore, event-oriented actions can be monitored, if data is passed to the monitoring device which characterizes these events, and the time interval is related to the corresponding event. This means that the microprocessor exercises certain functions dependent on a program counter. The monitoring device checks whether the microprocessor has processed the right function at the right point in time and whether it has processed the function within a predetermined time.

Figure 8:
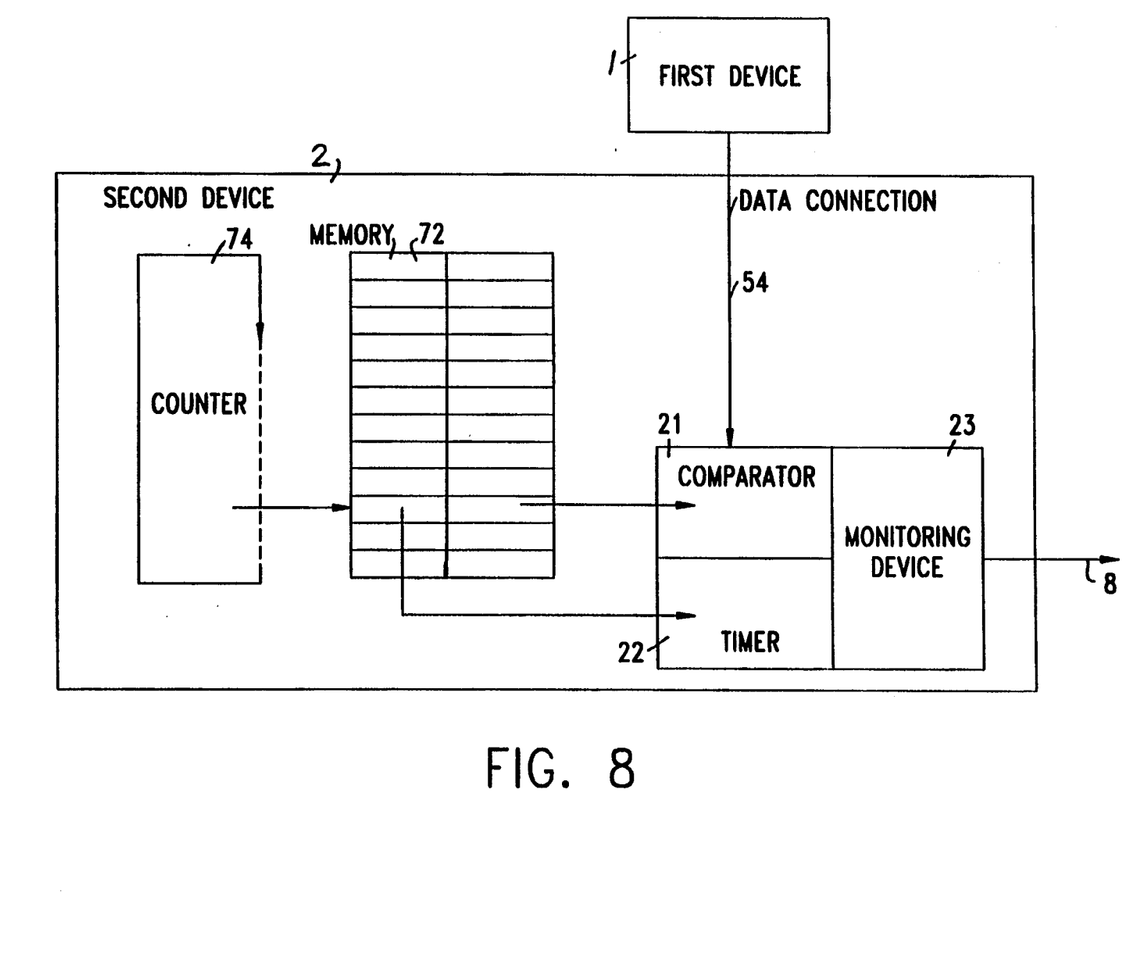
FIG. 8 shows a block diagram of another embodiment of the present invention.

As shown in FIG. 8, a table with reference data and related time durations is stored in a memory 72 of the monitoring device. The microprocessor must write test data into the monitoring device at the time point stored in the memory, via the data connection 54. The reference data and test data are compared with each other in a comparator 21. A timer 22 monitors the time point of the occurrence of the test data. The timer checks whether the test data occur within a certain time period. If the data occur earlier or later, this indicates an error state.

If the test data does not agree with the reference data and/or if the time duration is exceeded or not reached, the monitoring device 23 outputs a corresponding safety signal via the safety line 8. If the data agrees, the next value is processed in the memory. The memory is preferably implemented as a RAM memory, which is addressed by a counter 74 structured as a ring counter and initialized by the microprocessor when it is turned on. If the program counter status of the microprocessor at certain points of a control program are stored in the memory, for example, as well as maximum values for the related program sequence times between these points, the program sequence can be checked by the monitoring device. In this case, the maximum permissible calculation time is stored in the left column, and the corresponding program command is stored in the right column. Accordingly, event-controlled sequences can also be monitored. In this case, what is checked is whether a further event occurs within a predetermined time period after a certain event. For example, if a flank change in the rpm signal occurs, another flank change must be recorded within a certain time period.

Yet another embodiment of the system according to the present invention provides that input signals with special relevance for safety, such as an rpm transmitter signal, are passed to the microprocessor and to the monitoring device in parallel, and are acquired independently of one another. The output signals of one or more sensors are passed to the microprocessor and the monitoring device as first data. The data acquired by the microprocessor and the monitoring device is then compared. For this, the value acquired by the monitoring device is preferably passed to the microprocessor and processed there.

An improvement of such a system results from the fact that not one sensor but two sensors are used, where the actual rpm transmitter can be assigned to the microprocessor and the auxiliary rpm transmitter to the monitoring device. In addition, it can also be provided that the monitoring device and/or the microprocessor carry out limit value monitoring, and check for the existence of a measurement value which lies outside of the limit value(s).

Figure 9:
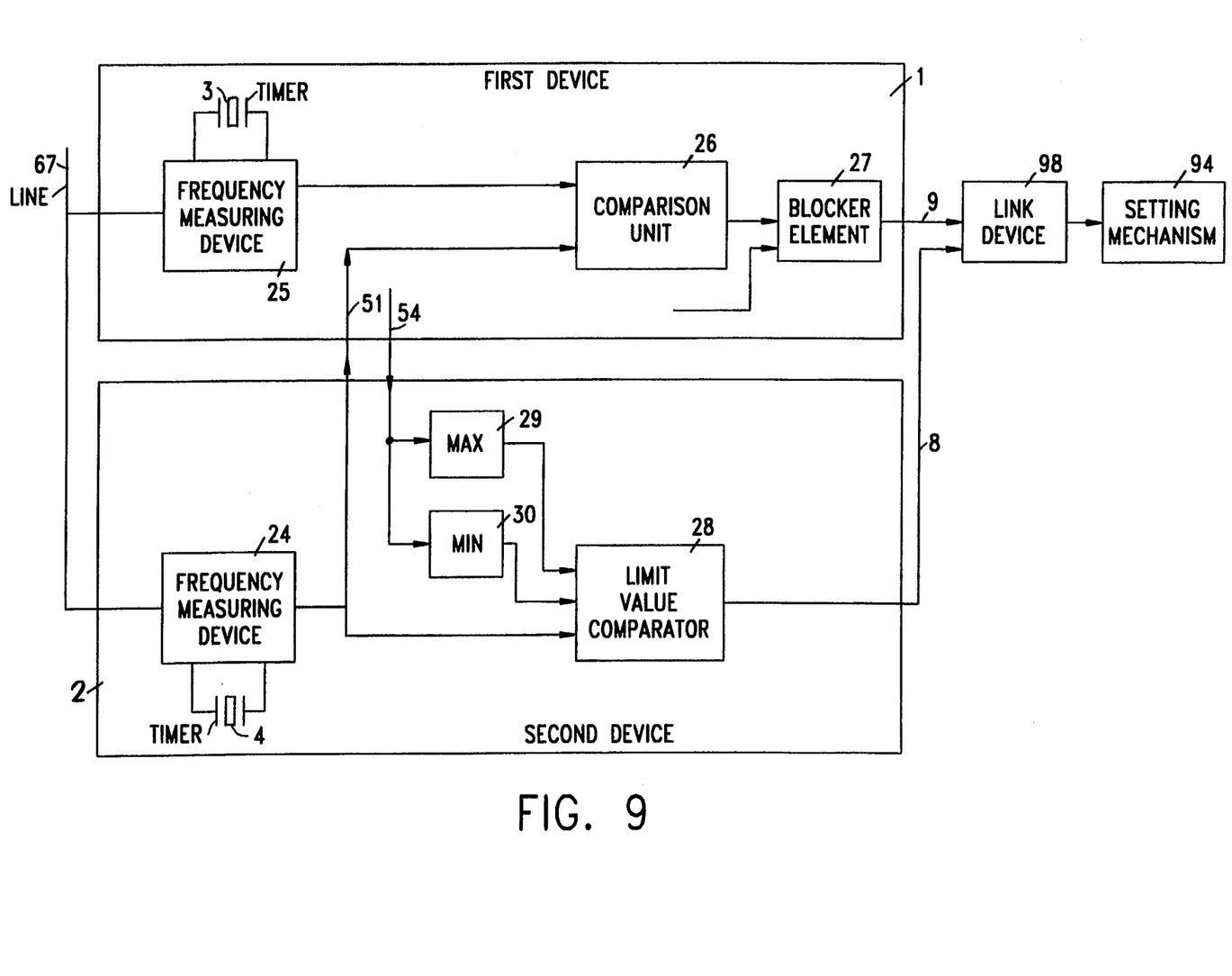
FIG. 9 shows a block diagram of yet another embodiment of the present invention.

For implementation of such a system, reference is made to FIG. 9. The microprocessor 1 and the monitoring device 2 are connected to a sensor (not shown) via a line 61. The transmitter signal arrives at a period measurement and/or frequency measurement device 25 and 24, respectively, which are connected to the timers 3 and 4, respectively. The monitoring device is connected to the microprocessor via a line 51. The period measurement device 25 and the line 51 lead to a comparison unit 26. The output signal of the comparison unit 26 arrives at a blocking element 27, at the second output of which the setting value is applied.

The frequency measurement device of the monitoring device 2 applies its output signal to the microprocessor and to a limit value comparator 28 via the line 51. The comparator is connected with two intermediate memories 29 and 30, which are in contact with the microprocessor via the connection 54.

The transmitter signal arrives both at the microprocessor and at the monitoring device via the line 61, and each is acquired by the period measurement and/or frequency measurement device 25 and 24, respectively, by means of the timers 3 and 4, respectively. The measurement result of the monitoring device is transmitted to the microprocessor via the connection 51, and compared with the measurement result of the microprocessor in the comparison unit 26. In case of non-agreement, the safety-relevant output signal is blocked by the blocking element 27. Within the monitoring unit, the measurement result of the frequency measurement device 24 is compared with an upper limit value MAX and a lower limit value MIN in the limit comparator 28. If the measurement result does not lie within these limit values, the safety-relevant output signal is blocked via the safety signal. The limit values MAX and MIN, respectively, which are stored in the intermediate memories 29 and 30, can be preset as desired by the microprocessor, via the connection 54.

What is claimed is:

1. A system for controlling a motor vehicle, comprising:
   a first device for processing data to control the motor vehicle, the first device receiving first data and determining second data based thereon in accordance with a predetermined test function;
   a second device coupled to the first device for monitoring the first device, the second device receiving the first data and determining third data based thereon in accordance with the predetermined test function;
   at least one of the first and second devices comparing the second data to the third data for detecting an error state based thereon;
   the first device deliberately outputting erroneous second data at predetermined intervals in order to determine whether the second device is functioning properly.

2. The system as recited in claim 1, wherein the at least one of the first and second devices detects an error state if the second data and the third data do not match.

3. The system as recited in claim 1, wherein the at least one of the first and second devices detects an error state if the second data and third data are not available within a predetermined period of time.

4. The system as recited in claim 1, wherein the first data includes a value of a counter.

5. The system as recited in claim 1, wherein the predetermined test function includes forming an inverted value of the first data.

6. The system as recited in claim 1, wherein the first device sends signals to the second device at predetermined time intervals, and the second device checks the signals.

7. The system as recited in claim 1, wherein the first data includes a position of a program counter.

8. The system as recited in claim 1, further comprising a sensor coupled to the first and second devices, the sensor acquiring safety relevant data, the sensor outputting the first data.

9. The system as recited in claim 1, further comprising a first and second sensor, the first sensor being coupled to the first device and the second sensor being coupled to the second device, the first and second sensors each acquiring safety relevant data and outputting the first data.

10. The system as recited in claim 9, wherein each of the first and second sensors independently acquires the safety relevant data.

11. The system as recited in claim 9, wherein an output signal of the first and second sensors is fed to an input of the first and second devices, respectively, and the first and second devices compare the output signals for detecting an error state if the signals are different.

12. The system as recited in claim 9, wherein the first and second devices determine whether output signals from the first and second sensors, respectively, are within a predetermined range of values.

13. The system as recited in claim 1, wherein the first device sends the second data to the second device.

14. The system as recited in claim 1, further comprising a data/address bus coupled between the first and second devices.

15. The system as recited in claim 1, wherein the second device includes a gate array.

16. The system as recited in claim 1, wherein if the second device detects an error state of the first device, emergency driving measures are initiated.

17. The system as recited in claim 1, wherein the second device includes means for counting the number of error states of the first device, and after a predetermined number of error states, emergency driving measures are initiated.

* * * * *